United States Patent [19]

Leighton et al.

[11] Patent Number: 5,351,302
[45] Date of Patent: Sep. 27, 1994

[54] METHOD FOR AUTHENTICATING OBJECTS IDENTIFIED BY IMAGES OR OTHER IDENTIFYING INFORMATION

[76] Inventors: Frank T. Leighton, 15 Charlesden Pk., Newtonville, Mass. 02160; Silvio Micali, 459 Chestnut Hill Ave., Brookline, Mass. 02146

[21] Appl. No.: 67,493

[22] Filed: May 26, 1993

[51] Int. Cl.[5] .......................... H04L 9/30; H04L 9/32
[52] U.S. Cl. ........................................ 380/30; 380/23; 380/24; 380/49; 340/825.31; 340/825.34; 235/379; 235/380
[58] Field of Search .................. 380/4, 21, 23, 24, 25, 380/30, 43, 49, 50; 235/379, 380, 382; 340/825.31, 825.34

[56] References Cited

U.S. PATENT DOCUMENTS

| | | | |
|---|---|---|---|
| 4,001,550 | 1/1977 | Schatz | 235/379 |
| 4,016,405 | 4/1977 | McCune et al. | 235/380 |
| 4,694,397 | 9/1987 | Grant et al. | 235/379 X |
| 4,748,320 | 5/1988 | Yorimoto et al. | 235/380 X |
| 4,749,982 | 6/1988 | Rikuna et al. | 235/380 X |
| 4,882,473 | 11/1989 | Bergeron et al. | 235/380 |
| 4,995,081 | 9/1991 | Leighton et al. | 380/23 |

Primary Examiner—Bernarr E. Gregory
Attorney, Agent, or Firm—David H. Judson

[57] ABSTRACT

The method and system of the present invention utilizes public-key cryptography to create "secure" titles for personal and real property such as vehicles and the like. The title preferably comprises a card in which is stored a digital signature of one or more identifiers such as a vehicle identification number, the vehicle license plate and the owner's name. To effect a transfer of the property, the digital signature on the title must first be shown to have been generated from the one or more identifiers.

9 Claims, 1 Drawing Sheet

METHOD FOR AUTHENTICATING OBJECTS IDENTIFIED BY IMAGES OR OTHER IDENTIFYING INFORMATION

TECHNICAL FIELD

The present invention relates generally to techniques for preventing counterfeiting or otherwise illegal use of documents (e.g., titles, licenses, proofs of insurance, etc.), especially documents relating to personal property such as vehicle.

BACKGROUND OF THE INVENTION

Vehicle theft is a major crime problem, especially in urban areas. One contributing factor to this problem is the ease with which stolen vehicles or their parts can be recycled in the marketplace. As is well known, manufacturers place or engrave a so-called vehicle identification number (VIN), which is unique to the particular vehicle, on the engine and all major parts to facilitate identification. The VIN is sometimes identified on the vehicle title, which is normally a conventional paper document issued by the particular governmental authority having the appropriate jurisdiction over the vehicle. The other standard vehicle identifier is the vehicle's license plates. Currently, titles, VIN's and license plates are quite unrelated to each other, thereby contributing to the ease with which an unauthorized party can recycle a stolen car.

There has therefore been a long-felt need to overcome these and other problems associated with securing documentation associated with personal or real property.

BRIEF SUMMARY OF THE INVENTION

It is an object of the present invention to provide a method and system for creating secure "titles" for personal and real property.

It is a further object of the present invention to describe a method enabling a given authority to secure valuable documents (such as titles, licenses, passports, registrations, etc.) from alteration and fraudulent use.

It is a further object of the invention to provide enhanced techniques to prevent legal titles or other documentation from being counterfeited or otherwise illegally altered.

It is a still further object to use public-key cryptography methods and systems to secure title documentation of any personal or real property wherein such property is identifiable by a unique identifier.

Yet another object of the invention is to provide for digitally-secure physical or virtual titles to thus facilitate the transfer of personal or real property.

In the preferred embodiment, a title according to the present invention include an identifier uniquely associated with the personal or real property to be identified (e.g., a vehicle identification number), and information directly or indirectly identifying the legal owner of the property. The identifier and the information are preferably concatenated into a data string which is then digitally signed using a secret key of a public-key cryptosystem pair. To verify the title, a transaction terminal uses a corresponding public key to decrypt the data string.

The method and system of the present invention thus utilizes public-key cryptography to create "secure" titles for personal and real property such as vehicles and the like. The title preferably comprises a card in which is stored a digital signature of one or more identifiers such as a vehicle identification number, the vehicle license plate and the owner's name. To effect a transfer of the property, the digital signature on the title must first be shown to have been generated from the one or more identifiers.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

The techniques described below are useful to provide titles or other documentation that are "secure," i.e., titles that cannot be counterfeited or illegally changed in any feasible way. Although the technology is described in the context of securing vehicle titles, the present invention is not intended to be limited to such particular application. It should readily be appreciated by those of skill in the art that the present invention has direct applicability to secure any and all kinds of titles and documentation (e.g., registrations, licenses, proof of insurance or inspection, proof of identity, etc.) and the invention should be and is intended to cover any and all such types of documentations, whatever their particular purpose or association may be. Thus, for example, the invention is useful to secure titles of all types of property including, without limitation, precious or semiprecious gems or stones, paintings, antiques, artifacts, art objects, firearms or guns, or any other object whose particular authenticity needs to be verifiable for whatever purpose the owner or transferor desires. Of course, the techniques are also useful in connection with real property such as deeds, surveys, and the like.

According to the present invention, so-called "digital signatures" are used to bind in an untamperable way certain quantities associated with a piece of personal or real property to thereby realize a "secure title" for the property. Digital signatures provide high security for the system at generally low cost. In the preferred embodiment of the invention, a digital signature is derived from a data stream (which will be described below) using a private or secret key of a "public-key cryptosystem" key pair. A "public-key cryptosystem" is a well-known security scheme which includes two "keys," one key which is public (or at least the key pair owner does not really care if it becomes public) and one key which is private or non-public. All such public-key cryptosystem pairs include a common feature—the private key cannot be determined from the public key. One such scheme is described mathematically in U.S. Pat. No. 4,995,081, which is hereby incorporated by reference.

Figure 1:
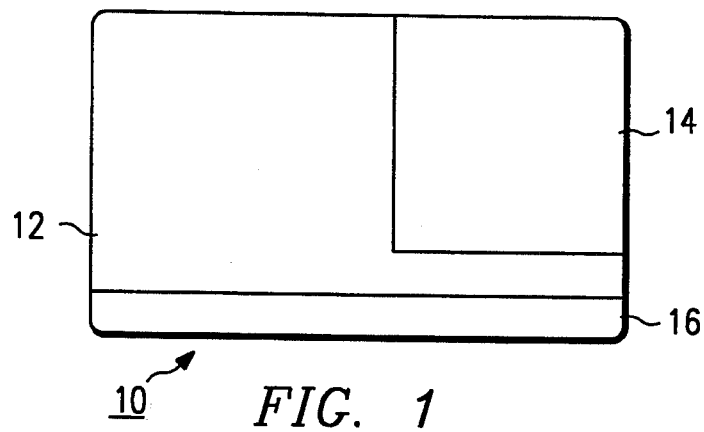
FIG. 1 is a schematic representation of one type card "title" according to the invention.

By way of further background and with reference to FIG. 1, a "title" card 10 is provided for maintaining the digital signature as well as perhaps other identifying information as will be described. The card is conventional in the physical sense that it includes a body portion 12 and a memory 16. A display 14 may also be provided. Although not meant to be limited, the memory 16 is preferably a magnetic strip or similar media, or an electronic memory such as a PROM, affixed to or embedded in the card in a known manner. The card 10 may or may not include a programmable microprocessor embedded in the body portion. Some portion of the memory may be "protected" against access such as described in the prior art. Such "protected memory" or similar data carrier products are available in the marketplace from such manufacturers as Innovatron. The card 10 may alternatively be any type of smart, magnetic, laser or other type of data carrier.

Figure 2:
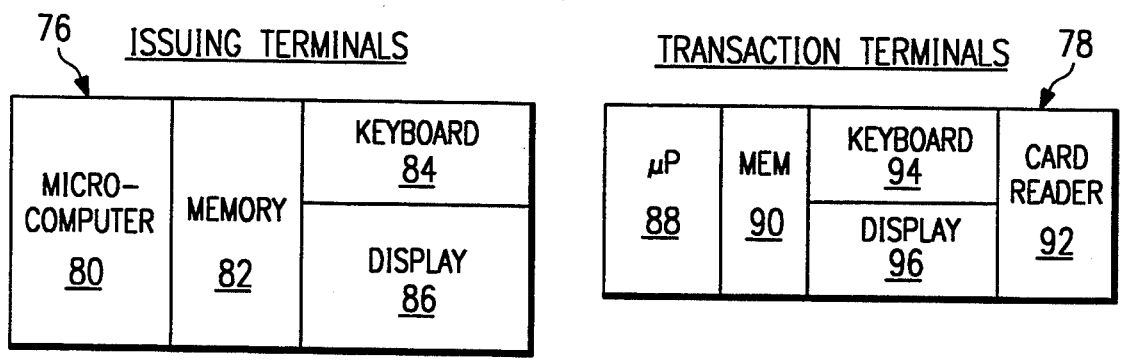
FIG. 2 is a block diagram of a representative multi-issuer system according to the present invention.

With reference to FIG. 2, in the preferred embodiment, an issuing terminal 76 includes a microcomputer 80 and associated memory devices 82 for storing operating programs and application programs for carrying out the invention. Input/output devices, such as a keyboard 84 and display 86, are provided for interfacing the terminal to the card issuer. One or more transaction or "verification" terminals 78 may also be provided for the purposes to be described. Such terminals preferably include a microprocessor 88, associated memory 90 and appropriate input/output devices such as a cardreader 92, keyboard 94 and display 96.

Now assume that it is desired to secure a vehicle title and that such security is desired by an Insurance Company. According to the invention, the Insurance Company or other suitable authority is provided with an issuing terminal to produce a digital signature of a bit stream on a card 10. That is, the Insurance Company has a public (verification) key and a matching private (signing) key, and the public and private keys form a key set of a public-key cryptosystem. To digitally sign a bit stream X, the Insurance Company (using its secret key) computes a second bit stream X' and writes it along with X on a card. X' mathematically vouches that the Insurance Company has "approved" the string X because:

1. everyone, given X and the Insurance Company's public key, can verify (e.g., using a transaction terminal) that X' is the Insurance Company's digital signature of X, and
2. no one, without the right key, can forge the Insurance Company's digital signature, Y', of a new string Y.

The use of public-key cryptography for this application is particularly advantageous because different bit streams have different digital signatures and because changing a single bit in an already signed bit stream causes the new, corresponding signature to change in a dramatic and unpredictable way. Thus a digital signature can be thought of as a very special sequence of "control bits."

According to the invention, the title of a car whose VIN number is X, will preferably comprise a card 10 containing the Insurance Company's digital signature, X', of X (and possibly also X itself). This card can be inserted in a transaction terminal, which reads the information written on the card and checks that X' is the Insurance Company's digital signature of X. (Indeed, all such units will possess the Insurance Company's public verification key.) No one can, however, make a fake title for a stolen car, since the thief will not know the Insurance Company's secret signing key.

The above technique is enhanced by incorporating the vehicle's license plate number. For instance, if a car has a VIN number V and a license plate number L, let X be the number obtained by combining V and L (e.g., by concatenating V and L). Then the title will comprise a card containing the number X', the Insurance Company's digital signature of X. This it will be impossible for an imposter to replace the license plate of a stolen car, since for any new number L', X' will not be the Insurance Company signature of XL'. The technique of course also allows for "personalized" license plates in lieu of or in addition to the plate number L.

In this manner the license plate number or other identifier is securely tied in the title. It should be appreciated that once a secure title of this form has been verified to be authentic, even if it was stolen with the car, it allows someone, e.g., a policeman or other government authority, to quickly verify that a car has been stolen by verifying whether a given license number has reported to stolen. This solves the common problem where, by taking away the license plate of a car not reported stolen (or not stolen or all) and mounting it on a stolen car, a thief may have a stolen car appear legitimate.

The system is yet further enhanced by incorporating the name of the car's owner. For instance, if a car has a VIN number V and a license plate number L, and its owner's name is N, then the title preferably comprises a card containing the number X', the Insurance Company's digital signature of the number X obtained by concatenating V, L, and N (and possibly some of V, L, and N themselves). This embodiment has many advantages. For instance, the owner can prove ownership of the car by providing the new title and a personal ID showing that his/her name is N. By securely including the name of the owner, an important advantage is provided because when the car is legitimately sold the owner must be present. Besides the owner's name, the Insurance Company may include in the title other information about the owner; e.g., the names of other authorized drivers.

More generally, besides V (or L, or N), the new title can contain an arbitrary information string, I. This string is digitally signed by the Insurance Company together with V (and/or L and N); that is, the new title will contain the Insurance Company's digital signature of the string VI. As described, string I may consist of L or N, or both, but may also be, for example, a description of the car or even a digitized image of the car. This may be useful, in case of accidents, to establish how the car "looked like" before and after an accident or other repair. The information string may include other important information about the vehicle such as an odometer reading or times and dates of service visits.

Several variations of the above techniques are also envisioned by the present invention. For instance, rather than the name of the owner, N, the new title may incorporate a string f(P), where P is a password known to the owner (and preferably only to the owner), and "f" is a one-way function. One-way functions are functions that are easy (for everyone) to compute but hard (for everyone) to invert. That is, if "f" if such a function, every one can, given, say, a number A, if it is long enough. Indeed, a brute-force search for A would require astronomical time even with the most modern and sophisticated computers if A consists of 100 digits or of a long enough sentence.)

Now assume that a new car has a VIN number V and license plate number L. According to the invention, the first legitimate owner of the car chooses a suitable large alphanumeric string A (e.g., his/her mother's maiden name) and sets f(A)=B. Then the number X is obtained by concatenating V, L and B, and the title will contain the Insurance Company's digital signature, X', of X. In this manner, only the legitimate owner can prove that he/she owns the car, since only he/she knows A. To verify ownership, one may in fact check that X' is the Insurance Company's digital signature of X=VLB, and then ask the alleged owner for the value A, and verify that indeed f(A)=B.

One advantage of this scheme is that the entire ownership history of a car can be certified without revealing the names of the owners. For instance, the first entry on the title contains the Insurance Company's digital signature of X=VLB as above. When the first owner wants to sell the car, he/she will reveal to the Insurance Company the value of A (such that f(A)=B), while the new owner will chose a value C such that f(C)=D. Then a second entry is added to the title containing the (possibly new) Insurance Company's digital signature of the concatenation of V, L (or possibly a new L', as when the second owner wants a personalized license plate), A and D. That is, the second entry certifies that the car has been legitimately sold once. In fact, anyone can read A from the second entry and verify that f(A)=B, the value unalterably bound to V in the first entry. This means that the first legitimate owner has consented to the sale, since he/she has willingly revealed the correct and unpredictable value A. The second entry may actually replace the first one (or the old title is destroyed and a new one is issued only containing the second entry). Successive sales are handled in a similar manner. The new buyer is thus always informed of the number of previous owners. It is thus possible to count the number of values B, D, etc. that are added to the title at each sale. Such a title can be conveniently left in the automobile, since stealing it will not enable a thief to sell the vehicle in a legitimate way; he will not be able to reconstruct the value A from B (if the car had only one owner when stolen), or the value C from D (if the car had two owners), etc.

An alternative method for obtaining similar benefits may be used if the digital signature adopted is such that a signature X' for a string X does not betray X, that is, if X cannot be reconstructed from X'. In this case, the new title may consist of, say VI (where I is the information string) and the Insurance Company digital signature, X', of VIA (where A is a string known to the owner). Thus, if the owner willingly provides A, anyone can verify that X' is the Insurance Company's digital signature of VIA, thereby verifying that both V and I have been certified, while without the cooperation of owner X' is quite useless.

As for another variant, if the title comprises a smart card, rather than sending or otherwise exhibiting or making available to the transaction terminal the digital signature of the relevant information, the card may simply "convince" such apparatus that it contains (e.g., in a protected area of the chip) the relevant signature, without explicitly giving it. One such technique for establishing such proof of legitimacy is described in U.S. Pat. No. 4,995,081, which as noted above is incorporated herein by reference.

Alternatively, rather than using a digital signature that can be universally verified (e.g., by means of a public verification key), the title may contain a private digital signature, that is a string that can be verified by a selected group of people (e.g., those who know, or whose verifying apparati know, a given secret key). This is a so-called private-key cryptosystem.

According to another embodiment of the invention, it is not required that the titles be specific physical objects (e.g., a magnetic, laser, or smart card). The advantages of the present invention can also be realized in a virtual manner, for instance, by means of an accessible database. As in the previous examples, the database preferably contains VINs digitally signed by a proper authority (and possibly by different authorities, each having a different signing scheme and different key, both public and secret). To verify the legitimacy of a title, an inquiring party (e.g., an insurance agent, policemen, a bank officer wishing to verify the information concerning collateral, departments of motor vehicles, etc.) can query the database with, say, a given VIN V, and receive in return a pair (V,S), where S is the digital signature of v by a specified authority. The querying party can then verify that S is a correct digital signature of V for the specified authority, whose verification key is publicly known. Thus, while the database can be made widely queriable, preferably only the proper authority can insert data therein. In fact, even assuming that a malicious party were able to illegally insert a given VIN V into the database, he would not be able to forge the digital signature of V (by the proper authority) that should be stored together with V and should be retrieved in case of a query. Without this signature, inserting V into the database is essentially useless, since V alone will not be accepted or believed by the querying parties. This security aspect is particularly attractive in that it protects a large and distributed database so as to make sure that no one can illegally write his own data in such database.

While described in the context of a vehicle title, it should be appreciated that the method extends to all other kinds of titles, when the object(s) of interest possess a string that, like the VIN, acts as a unique identifier of the object. Sometimes this unique identifier can be constructed ad hoc. For instance, in the case of a land title the string in question can be obtaining by writing down a sufficiently detailed English description of a given lot. This English string can then be digitized if desired.

It should be appreciated by those skilled in the art that the specific embodiments disclosed above may be readily utilized as a basis for modifying or designed other structures for carrying out the same purposes of the present invention. It should also be realized by those skilled in the art that such equivalent constructions do not depart from the spirit and scope of the invention as set forth in the appended claims.

What is claimed is:

1. A method for authenticating an object identified by a data string, the data string including a digitized image of the object, comprising the steps of:

generating a signature of the data string using a private key of a public-key cryptosystem pair, the public-key cryptosystem pair also having a public key M;

decrypting the signature using the public key M of the public-key cryptosystem pair; and comparing the decrypted signature with the digitized image to thereby authenticate the object.

2. The method as described in claim 1 wherein the data string is stored in a card having a memory.

3. The method as described in claim 1 wherein the data string also includes information identifying an owner of the object.

4. The method as described in claim 1 wherein the data string also includes alphanumeric information uniquely associated with the object.

5. The method as described in claim 1 wherein the data string includes information identifying an owner of the object and alphanumeric information uniquely associated with the object.

6. The method as described in claim 5 wherein the owner information and the alphanumeric information are concatenated with the digitized image to form the data string.

7. The method as described in claim 1 wherein the data string includes a text string describing the object.

8. A method for authenticating an object identified by a data string, the data string being stored on a storage media and including at least a digitized image of the object, comprising the steps of:

receiving the storage media and generating a signature of the data string using a first key of a cryptosystem pair, the cryptosystem pair also having a second key;

decrypting the signature using the second key of the cryptosystem pair; and comparing the decrypted signature with the digitized image to thereby authenticate the object.

9. The method as described in claim 8 wherein the cryptosystem is a public-key cryptosystem and the first key is a private key and the second key is a public key.

* * * * *